May 6, 1941.  W. E. CLARK  2,241,081

FRUIT JUICE EXTRACTOR

Filed Feb. 23, 1937  3 Sheets-Sheet 1

Inventor
William E. Clark
By
Attorneys

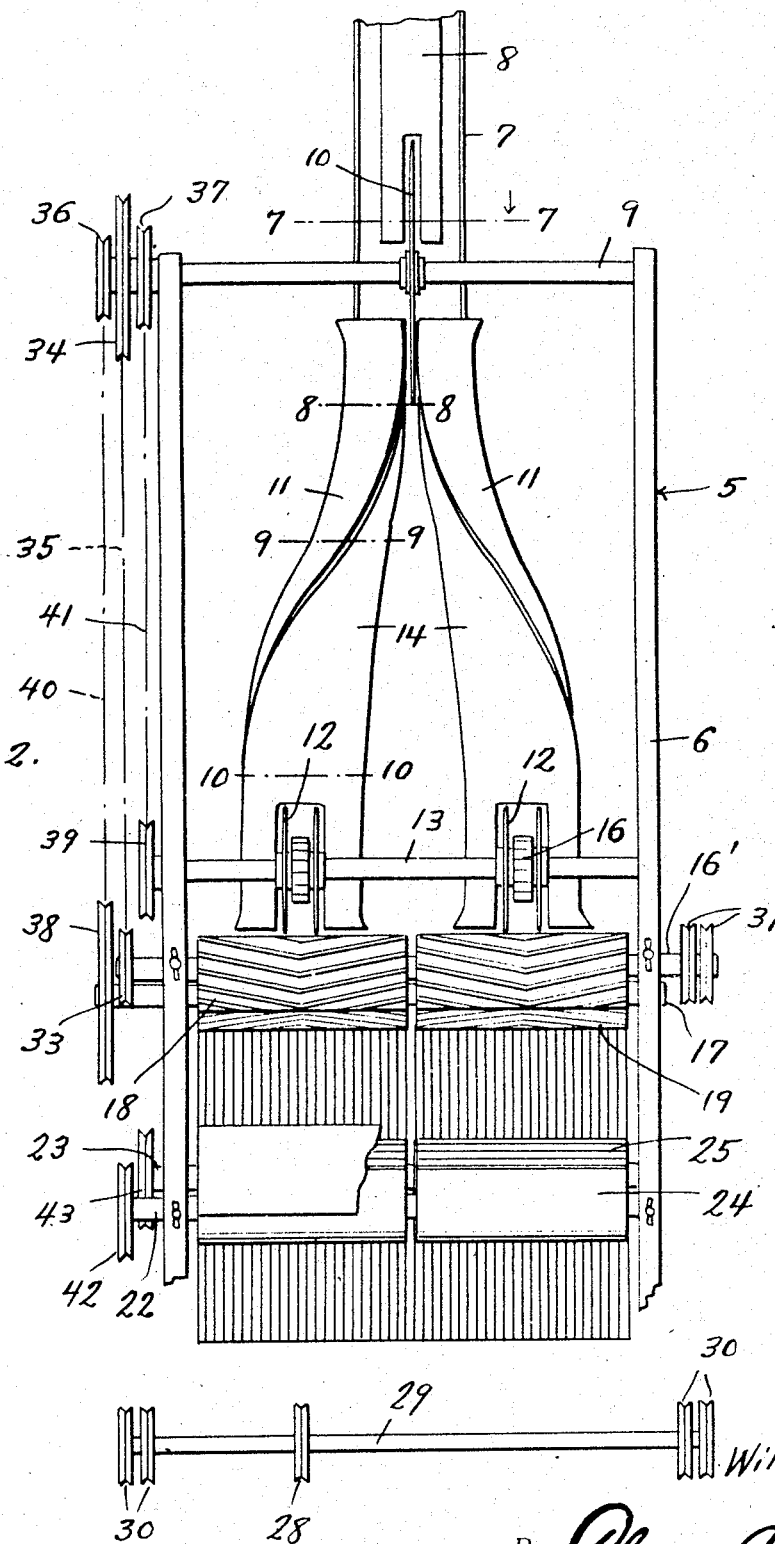

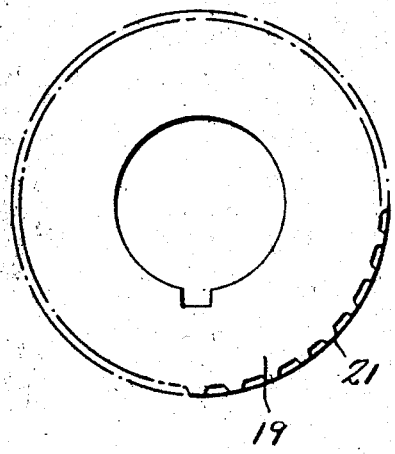
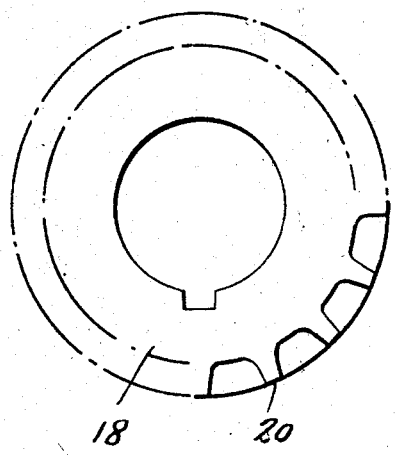
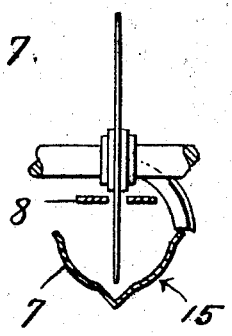
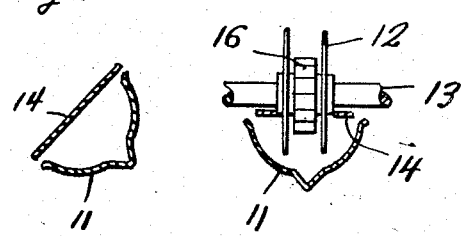
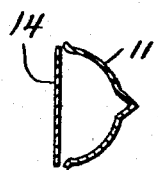

Patented May 6, 1941

2,241,081

UNITED STATES PATENT OFFICE 2,241,081

FRUIT JUICE EXTRACTOR

William E. Clark, Winter Haven, Fla.

Application February 23, 1937, Serial No. 127,334

1 Claim. (Cl. 146—3)

The present invention relates to fruit juice extractors designed principally for extracting juice from citrus fruits and has for its principal object to provide an apparatus adapted to more rapidly and completely extract the juice without rupturing the oil cells or glands in the peel.

More specifically the invention comprises an apparatus for separating the fruit into hemispheres, feeding each hemisphere to knives for partially cutting through the fruit and passing the fruit between extracting rollers, one of which is operated at a greater speed than the other and provided with corrugations to tear out the juice cells from the fruit and remove the same from the flat peel, leaving as much of the rag adhering to the peel as practical.

An object of the invention is to provide an apparatus of this character of simple and practical construction, efficient and reliable in operation, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:—

Figure 2 is a front elevational view, with the front wall removed to show the rollers and grid.

Figure 4 is a detail view of the jack shaft.

Figure 5 is an end elevational view of one of the feed rollers.

Figure 6 is a similar view of one of the extractor rollers.

Figure 1:
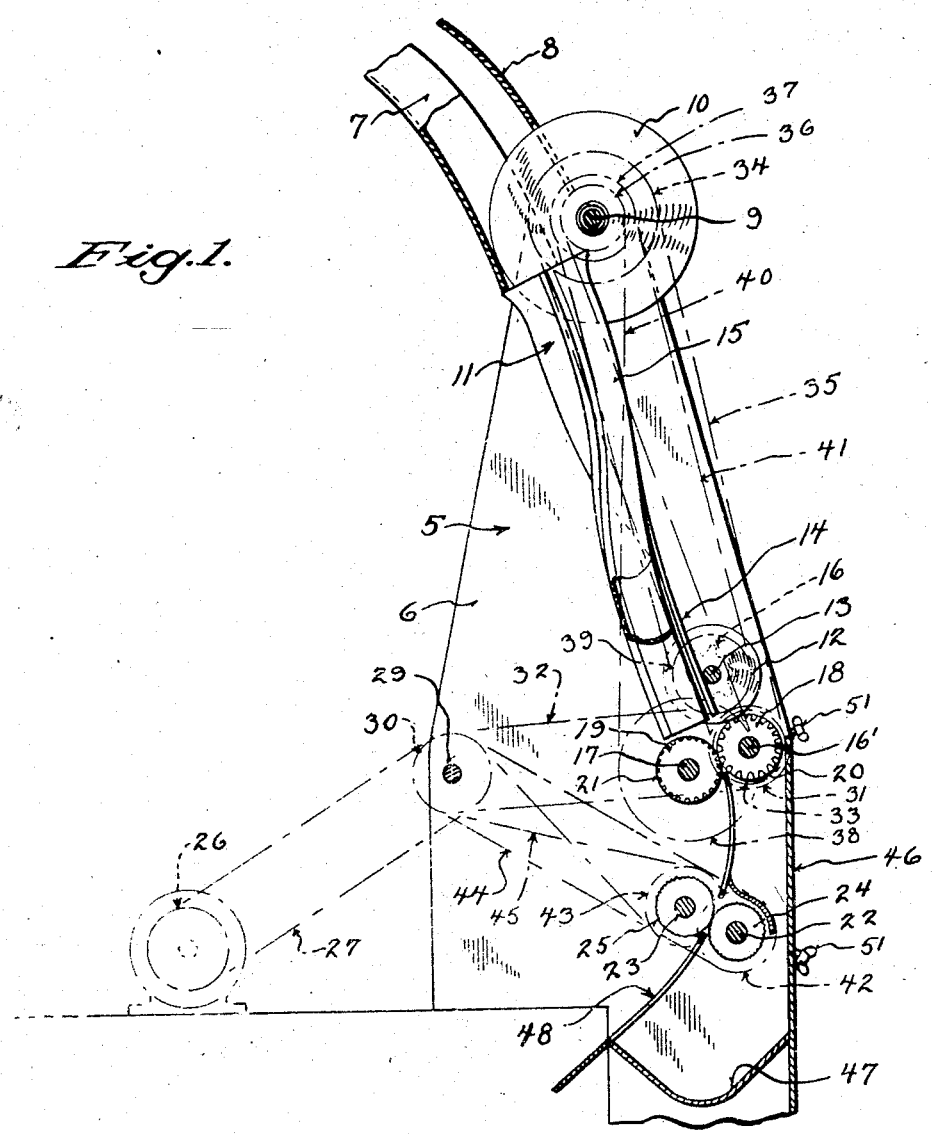
Figure 1 is a vertical sectional view through the apparatus showing my novel arrangement of rollers and grid.
Figure 3:
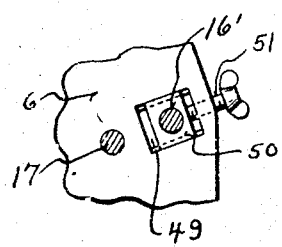
Figure 3 is a fragmentary detail view of one of the adjusting screws for the extracting rollers.

Figures 7 to 10, inclusive, are transverse sectional views through the feed trough taken respectively on the lines 7—7, 8—8, 9—9, and 10—10 of Figure 2.

Referring now to the drawings in detail, wherein for the purpose of illustration I have disclosed a preferred embodiment of the invention, the numeral 5 designates a casing which includes spaced parallel upstanding sides 6 within the upper portion of which extends a gravity feed trough 7 provided with a cover 8 to retain the fruit in position in the trough.

Extending between the sides 6 of the casing, at the upper portion thereof, is a shaft 9 having a circular cutting knife 10 secured thereto with the cutting edge positioned within the trough 7 to sever the fruit into hemispheres as the same are fed to the knife. Below the knife 10 the trough 7 branches into a pair of troughs 11—11, each of identical construction and arranged to receive the respective halves of the fruit as the same are cut. As more clearly illustrated in Figure 8 of the drawings the troughs 11, at their upper ends have their open sides positioned in opposed relation with respect to each other to receive the hemispheres of fruit as they are severed, each of the troughs having their open sides oppositely twisted outwardly in a manner as clearly illustrated in Figure 2 of the drawings to present the flattened surfaces of the fruit into position for engagement by a pair of circular knives 12 mounted in pairs in spaced relation upon a shaft 13 journaled in the sides 6 of the casing adjacent the lower ends of the troughs 11. The troughs 11 are also provided with covers 14 to retain the fruit in position in the troughs. As more clearly illustrated in Figures 7 to 10, inclusive, the troughs 7 and 11 have their walls concaved longitudinally as shown at 15 to conform more uniformly with the curvature of the side walls of the fruit and to prevent twisting of the fruit in the troughs while moving along the same.

The knives 12 are arranged to cut partly through the flattened surface of the sections of fruits and mounted on the shaft 13, between each pair of knives 12 is a toothed feed roller 16 for gripping the flattened surface of the fruits to accelerate the movement of the fruit during the cutting action.

A pair of shafts 16' and 17 are journaled in the sides 6 of the casing immediately beneath the shaft 13 upon which are mounted extractor rolls 18 and feed rolls 19, respectively. The rolls 18 and 19 receive the fruit from the cutters 12 and the surface of the rolls 18 are formed with longitudinally extending ribs 20 which are inclined with respect to the longitudinal axis of the rolls and converge toward the center of the rolls as more clearly illustrated in Figure 2 of the drawings. The rolls 19 are provided with similar ribs 21, but of relatively less depth than the ribs 20 of the rolls 18.

A pair of shafts 22 and 23 are journaled in the side 6 of the casing below the shafts 16' and 17 and have extractor rollers 24 and 25 mounted respectively thereon, said last-named rollers likewise having longitudinal ribs formed in the surface thereof.

Belt drive means is provided for the several shafts, comprising an electric motor 26 having a belt 27 operatively associated therewith for driving a pulley 28 on a jack shaft 29 journaled in the sides of the casing, each end of the jack shaft being provided with pairs of pulleys 30, the pulleys 30 at one end of the jack shafts 29 are connected to pulleys 31 on the shaft 16' by a belt 32, the other end of the shaft 16 having a pulley 33 connected to a relatively larger pulley 34 by a belt 35, the pulley 34 being mounted on the upper shaft 9. A pair of pulleys 36 and 37 are also mounted on the shaft 9 and are respectively connected to pulleys 38 and 39 by belts 40 and 41 for driving the shafts 12 and 17.

The pulleys 30 at the opposite end of the jack shaft 29 are connected to pulleys 42 and 43 by belts 44 and 45 for driving the shafts 22 and 23.

The pulleys 38 for operating the feed rollers 19 is larger than the drive pulley 36 and also larger than the pulley 33 on the shaft 16' and accordingly the rollers 18 will be rotated at a greater speed and accordingly as the sections of fruit pass between the rollers 18 and 19 the juice cells will be thrown away from the peel and thrown downwardly and outwardly against the front wall 46 of the casing where the same will be deposited in a trough 47 in the lower portion of the casing and removed to a suitable receptacle. A grid 48 extends between the extractor rolls 18 and 19 downwardly between the rolls 24 and 25 to catch the peel and remove the same from the casing.

It will be understood that the belts for driving the respective pulleys are arranged to rotate the several shafts in a direction to facilitate the feeding of the fruit downwardly and the shafts 16' and 22 are mounted in blocks 49 slidable in openings 50 in the walls of the casing and engaged by a threaded bolt 51 for adjusting the rollers 18 and 24 relative to the rollers 19 and 25, respectively.

It is believed the construction and operation of the apparatus will be readily understood from the foregoing without further detailed explanation thereof.

The present embodiment of the invention has been described in considerable detail merely for the purposes of exemplification since in actual practice it attains the features of advantage enumerated as desirable in the statement of the invention and the above description.

Having thus described the invention what is claimed as new is:

A juice extractor for citrus fruits comprising, means for cutting the fruit into sections, a juice-receiving trough arranged adjacent the lower end of the extractor, an arcuate rind and pulp separator grid extending over and beyond one longitudinal edge of the trough, a pair of parallel primary juice extracting rollers arranged above the grid for receiving the sections of the fruit, with one roller disposed completely on the inner side of the grid, and the other roller partially in front of the grid, means for conveying and delivering the sections of fruit from the cutting mechanism to the primary juice extracting rollers above the grid, and a secondary pair of parallel rollers disposed between the trough and the primary rollers and directly above said trough, the grid lying between the rollers of the last-mentioned pair of rollers.

WILLIAM E. CLARK.